United States Patent

Kiefer et al.

[11] Patent Number: 5,582,332
[45] Date of Patent: Dec. 10, 1996

[54] DEVICE FOR EMPTYING BULK MATERIAL CONTAINERS

[75] Inventors: Fritz Kiefer, Wolfach; Thomas Müller; Ralf Braumann, both of Hausach; Werner Fuchs, Haslach, all of Germany

[73] Assignee: Umformtechnik Hausach GmbH, Germany

[21] Appl. No.: 436,773

[22] Filed: May 8, 1995

[30] Foreign Application Priority Data

May 6, 1994 [DE] Germany ............ 44 16 009.7

[51] Int. Cl.⁶ ........................ B67D 3/00
[52] U.S. Cl. ................... 222/504; 222/509
[58] Field of Search ............ 222/185.1, 199, 222/200, 504, 509, 518, 559, 547, 564, 63

[56] References Cited

U.S. PATENT DOCUMENTS

| 2,858,966 | 11/1958 | Pfening | 222/504 |
| 4,691,843 | 9/1987 | Dunan | 222/509 |

FOREIGN PATENT DOCUMENTS

| 0049992 | 4/1982 | European Pat. Off. | |
| 1006824 | 4/1957 | Germany | 222/504 |
| 1152877 | 8/1963 | Germany | |
| 1928969 | 9/1965 | Germany | |
| 2136758 | 1/1972 | Germany | 222/504 |
| 3247445 | 6/1984 | Germany | |
| 3718428 | 6/1987 | Germany | |
| 90/08724 | 8/1990 | WIPO | 222/504 |

Primary Examiner—Andres Kashnikow
Assistant Examiner—Philippe Derakshani
Attorney, Agent, or Firm—Dominik & Stein

[57] ABSTRACT

Emptying device for bulk material container (1) with a discharge funnel (2) and a conically shaped closing part (3), which is axially displaceable in an encapsulated guide cylinder (16). The closing part (3) is held against the inner wall of a discharge funnel (2) under pressure by the working of a return spring (40). The return spring (40) is integrated in the internal space (17) of the guide cylinder (16) and is directed against a pressure plate (22) mounted axially slideably within the guide cylinder (16). The pressure disk (22) is provided with a pressure rod (24), which axially transcends the guide cylinder (16) in the manner of a piston rod and projects upwardly. For raising the pressure disk (22) to the discharge position the pressure disk is acted upon by a lifting device, which according to a preferred embodiment is likewise completely encapsulated, wherein the necessary supply media for the operation is delivered via the lift device (7) supporting struts. Therewith, an emptying device can be realized, with which the bulk material is discharged essentially unimpeded from the bulk material container. By the practically completely encapsulated various construction elements, a particularly simple and complete cleansing operation is made possible, so that the device is preferred when used with foodstuffs and in the pharmaceutical industry.

20 Claims, 6 Drawing Sheets

DEVICE FOR EMPTYING BULK MATERIAL CONTAINERS

The invention concerns a device for emptying bulk material containers of the type set forth in the preamble of claim 1.

This type of emptying device is needed in order to empty small containers with funnel-shaped discharge outlets into a storage container or the like at the point of destination. This is accomplished by placing the container containing the flowable material on top of a receiving station which, in general, is not mobile, and which is adapted to the discharged geometry of the container so that the opening-and-closing part can be actuated, so that the flowable material is discharged from the container in charges which can be received by the collecting, processing or storage containers placed underneath the emptying station. For this there can be used an emptying device as has been developed by the applicant and is already known, wherein a discharge funnel is provided at the bottom end of a bulk material container, which is provided with a conical shaped closure part which projects into the inside of the container. The closing part is mounted so as to be axially slidable in a cylindrical guideway, which guideway is spaced apart from the discharge funnel by means of struts. On the struts, there are provided spiral shaped springs, which on their opposite ends engage with a closing part and which hold this closing part fixed under tension against the inner wall of the discharge funnel. The closure part is provided on its bottom side with a circumscribing closure seal, so that in the closed position, a tight seal is obtained between the closure part and the discharge funnel. The sealing effect is enhanced as a result of the weight of the material to be discharged, which urges against the conical closure part from above and therewith additionally contributes to the holding of the discharge funnel under pressure against the inner wall.

For opening of the closure part, it is necessary that the container be placed upon the emptying station, so that four pneumatic cylinders associated with the emptying station are extended and can effect the closure part. The pneumatic cylinders lift the closure part so that the flowable material can exit between the closure part and the discharge funnel.

Although this type of emptying device has in principle proven itself to be effective, it thus nevertheless possess a number of disadvantages.

For the first part, a complex and expensive construction is necessary for the control of the four pneumatic cylinders, in order to realize an exact lifting of the closure part in the form of an axial displacement. Further, it has been shown that the flowable material, in particular flowable material in the form of fine particles, can leads to a impairment of the operability, since it penetrates in the various clefts, cut-backs, etc., and is almost impossible to subsequently remove therefrom.

A further problem occurs in using the device in foodstuff or pharmaceutical related applications, since it is necessary that the container and emptying station be capable of being cleaned to leave no residue. With the known emptying devices this can be accomplished only with great difficulty, since the guide means, springs and further construction elements on the inside of the closure part are difficult or impossible to access. Further, cleaning material residues frequently remain on these difficult to access construction elements, which can result in and undesired or impermissible contamination of material during the discharge thereof.

The invention thus addresses the problem of developing an emptying device of the above discussed type, so that it does not any longer possess the above discussed disadvantages. In particular, the device should positively prevent an undesired penetration of flowable material particles into clefts, rifts or cut-backs, and make possible a practically residue-free cleansing.

The above problem is solved with an emptying device, which exhibits the characteristics of claim 1.

Characteristics of preferred embodiments of the invention are set forth in the dependent claims.

The invention is based upon the idea, to make as much use of as possible of flat surfaces in the internal space within the conical shaped closure part, and this is accomplished by the provision of a return element with a single centrally located and encapsulated return spring within the cylindrical guideway. With this, it is possible to combine the return function and the guide drive function in a single, enclosed construction element and therewith to eliminate the coil springs which until now lie exposed between the closure part and the discharged funnel. With this there disappears the main problem in connection with contamination or, as the case may be, the harboring of material particles. At the same time, the discharge of flowable materials is facilitated since the return part is no longer extending through the flow area. The encapsulation can be accomplished by means of a cylinder with seals, so that an unintentional penetration of flowable material particles is absolutely insured against. At the same time, air is charged to and released from the inside of the cylinder realized in accordance with the present invention using suitable channels, wherein a controlled delivery and evacuation of compressed air is used for facilitating a displacement movement of the closure part which does not impede it and/or such that it can be held open with a minimal amount of surplus pressure, and thus absolutely ensures against a penetration of flowable material particles.

A further aspect is directed thereto, that the struts which are supporting the guide cylinder of the closure part are so constructed that a deposit of flowable particles is positively prevented. In particular, suitable are struts with a diminishing slope of the outer contour so that neither flowable particles nor cleansing material residues are able to finding purchase.

A further important aspect of a preferred embodiment is directed to an optimal configuration of the emptying station as a component of the emptying device. In accordance therewith, the closure part is acted upon by a single, centrally located pneumatic cylinder, which is held in place by means of radially extending support struts in the flow-through area of the emptying station. At the same time, supply channels are integrated within the inside of the support struts and continue out via connecting elements provided on the outer wall of the emptying station. Therewith, the construction of the bottom part of the emptying device, namely, the emptying station, is practically completely flat and without cut-backs or projections. The flow-through area of the emptying station is no longer constrained by the relatively voluminous pneumatic cylinders provided on the rim, and deposits of flowable materials or cleansing materials are therewith positively insured against.

One approach to this problem which has been previously attempted is known from DE-PS 37 18 428, wherein the emptying station is provided with a central mandrel on the support struts, which during seating of the container upon the station acts to lift the conically shaped closing part automatically. This mandrel is, however, necessarily fixed in its position, so that the opening operation can only be accomplished by the seating of the container on the emptying station and this cannot be controllably operated. When using this device the closure part is, during the seating process, partially opened in advance, that is, before the container is completely seated on the emptying station. For a number of applications this type of emptying device is, accordingly, not suitable, in particular not for the above discussed applications in the foodstuff and pharmaceutical industries since there, for hygienic and septic reasons, the container with its discharged funnel must be positively seated on the discharged area of the emptying station before the closure part may be operated.

Further, EP 0 049 992 Be discloses an actuation part which is located centrally on the conically shaped closure part and can be controllably operated. What is disclosed is a step-wise activatable bellows device which is connected to the closure part by complex and expensive means including a vibrator. It is constructed, however, with a large number of cut-backs, cracks, fissures, and dead corners, which extend through large parts of the flow-through section and thus provide attractive deposit possibilities for dirt particles and cleansing material residues, as has already been shown to be a disadvantage of a previous emptying device of the present applicant.

According to a further preferred embodiment of the invention, hollowed-out air passageways are provided within the pneumatic lift device, that is, the pneumatic cylinder, such that optimal pressure relationships are appropriately insured in order to, on the one hand, achieve an optimal displacement movement of the pneumatic cylinder, and on the other hand, to prevent any penetration of flowable material particles into the inner workings of the lift device during the operation thereof. For this, the support struts which are already in place for the lift device are employed so that the provision and discharge of air can be accomplished without additional supply lines or the like.

The invention is now discussed in greater detail by reference to the figures wherein the illustrative embodiments of the invention are represented schematically. There is shown.

Figure 1:
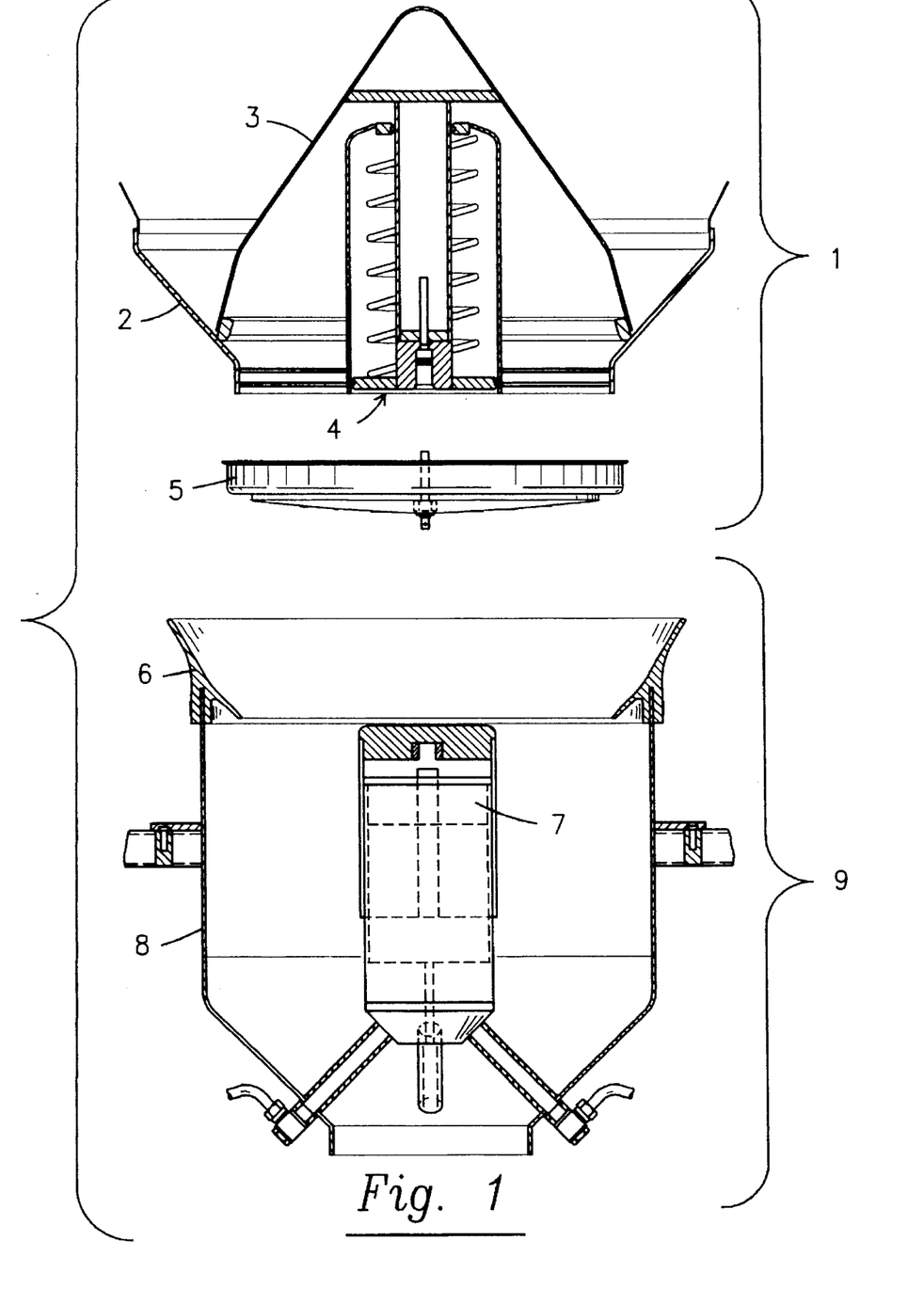
FIG. 1 fundamental construction of the emptying device.

In FIG. 1, the fundamental construction of the emptying device is shown. It is comprised essentially of a discharge area of the flowable material container 1 which is designed in accordance with the conventional configurations and which is schematically represented in FIG. 1. There is shown a conically shaped closure part 3 with a thereon mounted cylindrical guide 4 for a discharged funnel 2. In order to provide a supplemental means for insuring against contamination during transport, a lid 5 is optionally provided which forms a hermetic seal and can be fixed in place from underneath against the discharge funnel 2.

The emptying device comprises as a further construction part the emptying station 9 which, as a rule, is constructed to be permanently in place with, for example, a frame for securing to the surface or below the surface and which is associated with a storage container (not shown) or the like. The emptying station 9 includes a flow-through area 8, which is provided with an upwardly directed sealing cuff 6. This is provided in order that the discharge funnel 2 of the flowable material container 1 can tightly engage and seal upon seating upon the emptying station 9.

On the bottom end of the emptying area 8 a pneumatic lift device 7 is mounted, which is adapted to conform to the guide 4 of the bulk material container 1 and is designed for lifting the closure part 3 of the bulk material container 1 which has been seated, so that the bulk material (not shown) can be emptied into the emptying station 9.

The inventive emptying or discharge device is comprised of the construction parts 1,9 which are precisely constructed for mating engagement with each other in order that the intended emptying function can be realized. In the following there will be discussed in greater detail an illustrative embodiment based upon the concept of an emptying station which is permanently mounted, and upon which the movable storage bulk material container 1 functions as a transport container and is capable of being seated. In an analogous way, it is, however, possible that the construction parts 1,9 are associated with a non-movable emptying station, in order, for example, that a large container in the form of a silo or the like is provided with the emptying device according to the present invention. Even in the last mentioned case of the silo, an optimal discharge of the therein stored bulk material is accomplished in accordance with the present invention, insofar as there is a common problem to be solved and objective in common with the mobile storage material bulk container.

Figure 2:
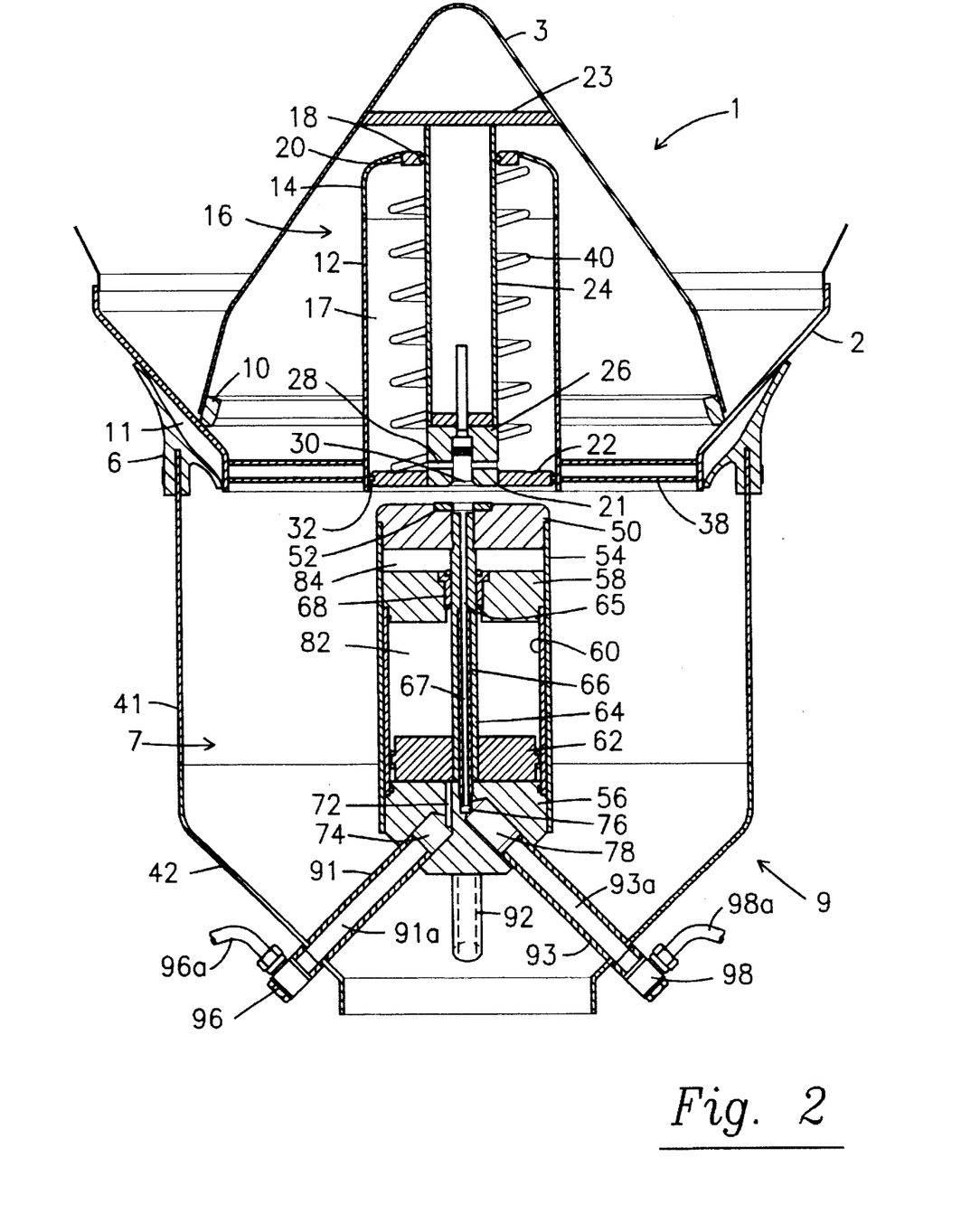
FIG. 2 axial cross section of the emptying device in the closed position.
Figure 3:
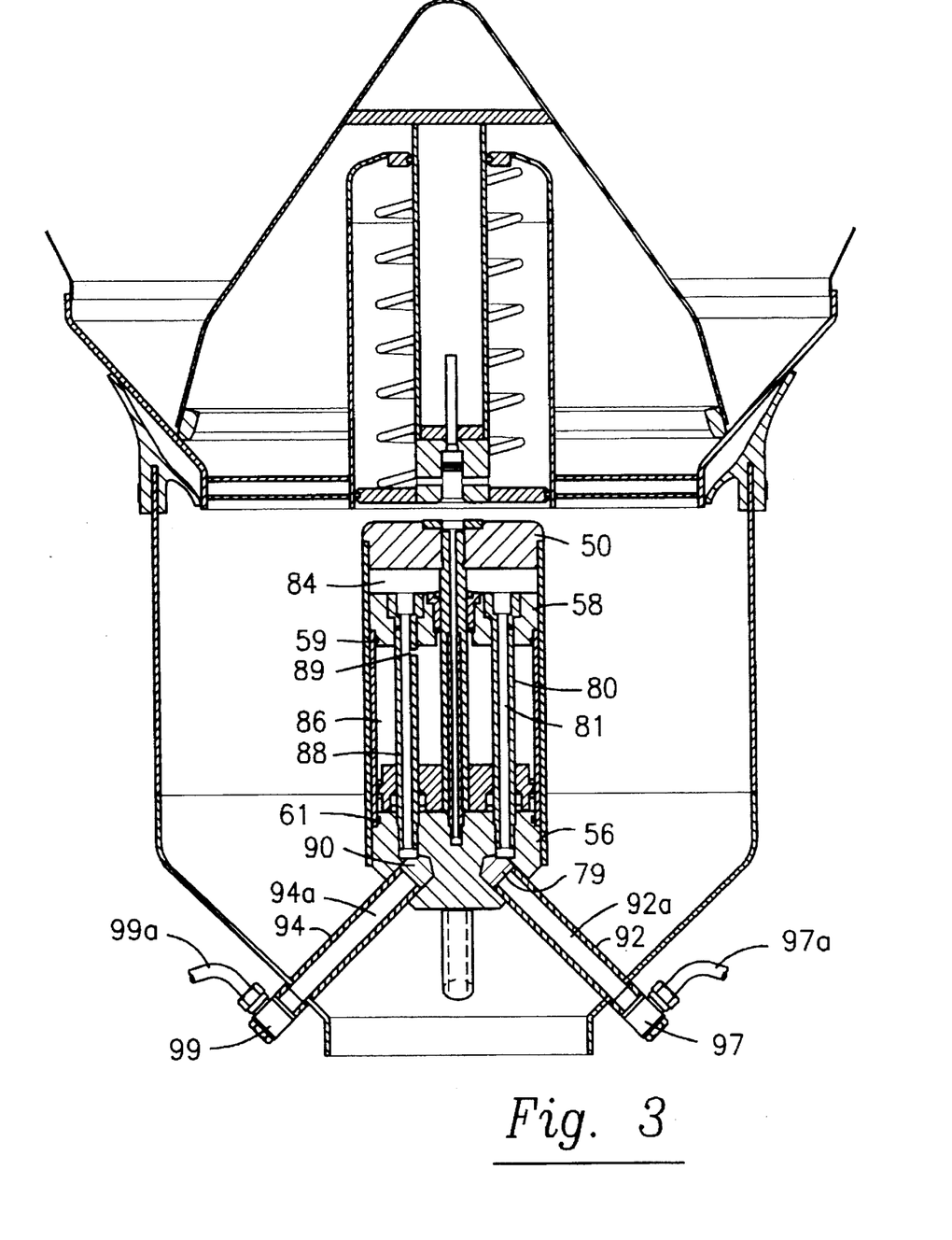
FIG. 3 further axial cross section (perpendicular to the cross-sectional plane according to FIG. 2) of the emptying device in the closed position, FIG. 4 emptying device according to FIG. 3, however, in open position, FIG. 5 further variation of the emptying device in the open position, and FIG. 6 further operable variation of the emptying device with integrated removal means in the closed position.
Figure 4:
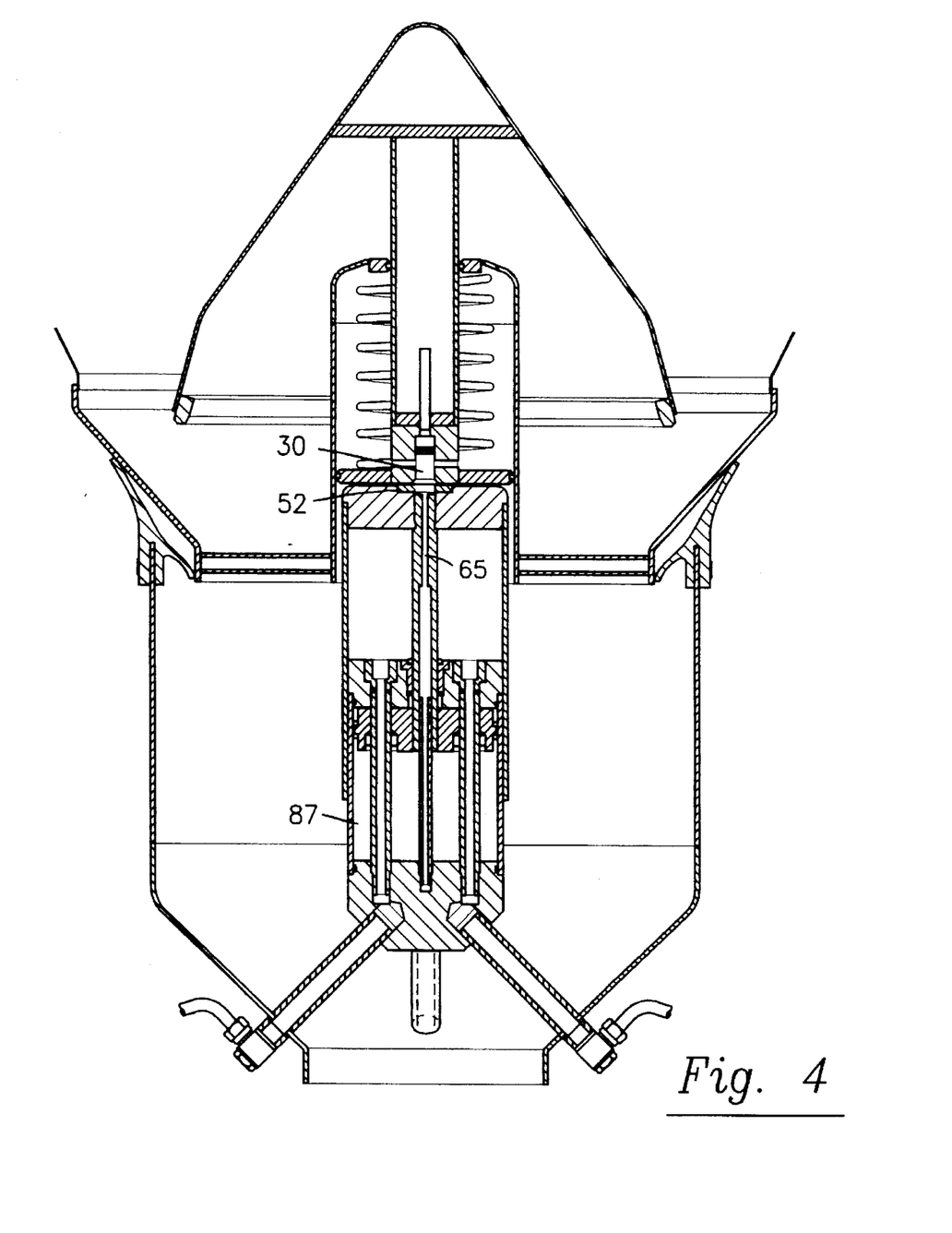

In the representations according to FIGS. 2–4, concern a preferred embodiment of a bulk material transport container 1 which can be seated upon a fixed position emptying station 9. In FIGS. 2 and 3, the bulk material container 1 is seated upon the emptying station 9 and is in the closed position. In this position, the conically shaped closure part 3 is held against the inner wall of the discharged funnel 2 and a circumscribing sealing ring 10, which is provided on the bottom end of the closure part 3, sealingly engages with elastic deformation. The discharged funnel 2 extends with axial overlap into the upper portion of casing tube 41 of the emptying station 9, wherein the transition is sealed by means of a sealing cuff 6. The sealing cuff 6 is seated on the upper portion of casing tube 41 and is pressed against the discharged funnel from outside. The discharged funnel 2 is approximately L-shaped in cross section in this area so that the two respective opposing ends of the sealing cuffs 6 form a hollow space 11 on the discharged funnel 2. This leads to a particularly good sealing effect since, on the one hand, in two separate and distinct axial positions, a circumscribing abutment of the sealing cuffs 11 on the discharged funnel 2 is accomplished and, on the other hand, by means of the elastic deformation of the sealing cuffs 6 in the hollow space an underpressurization is accomplished or can be accomplished, which prevents against an unintentional lifting of the sealing cuff 6 from the discharged funnel 2 during light and not to be prevented relative movement between the bulk material container 1 and the emptying station 9 during the discharge process.

The pretension force, with which the closure part 3 is held against the inner wall of the discharged funnel 2, is achieved by means of a return spring 40. The return spring 40 is provided completely encapsulated on the inside of the guide cylinder which is essentially comprised of a cylindrical guide 12 and a closing part 14. The cylindrical guide 12 is held in place by means of radially projecting struts 38 internally and on the discharge end of the discharge funnel 2. The struts 38 are shaped tubularly so that on the one had they impede the flow during the discharge process as little as possible and on the other hand provide no attachment points for the bulk material particles. The rounded cross-sectional shape encourages the run-off of cleaning material residues, so that this selected cross-sectional shaped offers an additional advantage of a simplified and effective cleaning operation.

The guide cylinder 16 has the further function of providing guidance for the closure part 3. For this, a pressure disk 22 is provided, which is displaceably mounted in the guide cylinder 16 in the manner of a piston. The pressure disk 22 is connected to a pressure rod 24, which extends axially upwardly through the guide cylinder 16 in the manner of a piston rod. The upper side of the pressure rod 24 is provided with a carrier ring or bearing ring 23, which for its part receives closure part 3. An axial displacement of the pressure disk 22 results in a corresponding displacement of the closure part 3. The return spring 40 is constructed as a pressure spring and is supported between the pressure disk 22 and the closure part 14 of the guide cylinder 16.

The internal space 17 of the guide cylinder 16 is sealed with respect to the environment so that no bulk material particles or cleaning fluid residue can penetrate. For sealing, the pressure disk 22 is provided on its outer circumference with a circumscribing sealing ring 32, which on the inner wall of the cylinder guide 12 can move along. Further, there is a ring seal 18 in the area of the through passage of the pressure rod 24 through the guide cylinder 16. This is held by a disk 20, which is held on the closure 14. The disk 20 serves at the same time for the radial guidance of the return movement of the screw path of the return spring 40.

As a result of the sealed construction of the internal space 17, it is necessary to make it possible to introduce and discharge air, in order to accomplish the desired displacement movement of the pressure disk 22, without causing an overpressurization or underpressurization in the internal space 17. Strong overpressurization in the internal space 17 is not desirable, since this would undesirably impede the displacement of the pressure disk 22. Overpressurization in small amounts can, however, be permitted and may even be desirable, as this aids in the prevention of an undesired penetration of bulk material particles.

The building up of underpressurization in internal space must be guarded against at all costs, since such would increase the danger, despite the sealed construction, that bulk material particles can enter into the internal space Accordingly, the pressure rod 24 is provided with an axial segment 26, which is provided with a central axial bore 30 which extends from the face side 21 and which has an orifice connection with multiple essentially radially projecting bores 28 which establish the connection to the internal space 17 of the guide cylinder 16. The radial bores 28 or, as the case may be, the radial bore containing axial segment 26 faces the pressure disk 22, so that the filling and deflation of the internal space 17 is possible also even at maximum lift position of the pressure disk 22.

Taking into account the direction of movement of the pressure disk 22, there can also be provided within the bores 28,30 a pressure equalization flow. Further, the pressure equalization flow can actively be encouraged, insofar as compressed air can be delivered or air withdrawn by suitable, in accordance with further discussed means and via the bores 28,30. Herewith, it is in principal also possible to establish and maintain a small overpressurization in the internal space 17, in order, as discussed above, that the penetration of bulk material particles is absolutely and securely prevented.

The closure part 3 is operated by means of a pneumatic lift device 7, which is associated with an emptying station 9. The pneumatic lift device 7 is exactly constructed to conform to the pressure disk 22 and is therefore constructed to displace this from the closed position as shown in FIG. 2 to the open or discharge position as shown in FIG. 4. At the same time, the pneumatic lift device is provided with further functional details, so that the discharge process of the bulk material is optimized.

The pneumatic lift device 7 is comprised of a single, centrally located pneumatic cylinder 50–90, which is securely held in the flow-through area 42 of the emptying station 9 by means of radially extending support struts 91,92,93,94. Therewith, the discharge material is provided with a practically uninterrupted circular cross section in the area of the upper portion of casing 41 and the flow-through area 42 which makes it possible to quickly discharge bulk material out of the bulk material container 41 Further, there are hardly any cracks or cut backs or recesses in which bulk material particles can lodge.

The pneumatic lifting device 7 is again completely encapsulated so that an optimal functioning is ensured in connection with a good cleaning ability. The four support struts 91,92,93,94 are symmetrical, radiating inwards and are associated with a distributor block 56. On the distributor block or distributor ring 56 the cylindrical wall 60 is seated, which for its part, carries a cylinder lid 58.

Accordingly, there results an internal space within the cylinder space 82 in which a piston 62 is axially slidably mounted. This thus segregates the cylinder space 82 into an upper displacement space 86 and a lower displacement space 87, of which the respective volume depends upon the position of the piston 62 which is variable.

The cylinder space 82 is sealed against high pressure by means of sealing rings 59,61 on the one hand where the distributor block 56 transitions to the cylinder wall 60 and on the other hand where the cylinder wall 60 connects with the cylinder lid The piston 62 is activatable with compressed air for actuation of the closure part 3, which compressed air can be supplied via the supply channel 72 integrated in distributor block 56. For this, a throughgoing bore hole 74 is provided in the distributor block into which the strut 91 is seated and which depends from the supply channel 72. The strut 91 is constructed to be hollow like a tube, so that a supply channel 91a is formed inside. On the end facing the flow-through area 42, there is on the outside a coupling element 96 for a supply line 96a. By means of the supply line 96a high pressure air can be supplied to the lower displacement space 87 using high pressure sealed means and via the support strut 91 and the distributor block 56, in order that an upwardly directed axial displacement of the piston 62 is achieved, and on the other hand, the lower displacement space 87 can be exhausted or evacuated therewith during the downward or return movement.

The piston 62 is connected to a piston rod 64 which extends through the cylinder lid 58 and bears on it's other end the pressure plate 50, which is directed against the pressure disk 22 of the closure part 3. The piston rod 64 is guided by guide box 68 in the area of the cylinder lid, which additionally affords sealing means for the cylinder space 82.

The pressure plate 50 is provided with a downward directed casing bolt 54, which is guided along cylinder wall 60 with minimal radial tolerance. Therewith, it is ensured, that the interstitial space 84 between the cylinder lid 58 and the pressure plate 50 is sealed during the extension of the pressure plate 50. The casing 54 achieves therewith a type of encapsulation of the total pneumatic lifting device 7 even during maximum extension of the pressure plate 50. The interstitial space 84 substantially is closed off whereby essentially a relatively narrow radial ring spaced between the casing 54 and the cylinder wall 60 remains which substantially protects against the intrusion of bulk material particles.

The outer diameter of the casing 54—and therewith also be pressure plate 50—is somewhat narrower than the internal diameter of the guide cylinder 16 so that a smooth deployment and return of the pneumatic device 7 is possible. As can be seen, for example, from FIG. 4, there remains between the internal wall of the guide cylinder 16 and the casing 54 a certain radial tolerance, in order that a flawless actuation can be accomplished also even in the case that the bulk material container 1 is not perfectly centered upon the emptying station 9.

The further structural details are directed to the emptying and filling of spaces, such as for example the internal space 17 of the guide cylinder 16 or the interstitial space 84 of the lifting device 7, which for reason of the encapsulation of the device is necessary or at least desirable.

In FIG. 2, there is shown the air flow arrangement for filling and deflating of the internal space 17 of the guide cylinder 16. For this, the distributor block 56 is provided with a central piston rod tube 66, upon which the piston rod 64 is axially displaceably and sealingly guided. The piston rod 64 is provided with a through-going passageway 65 which on the one hand provides communication between the throughhole 67 of the piston rod tube 66 and on the opposite side with the pressure plate 50 in the area of the sealing ring 52. There results therewith a sealed, through-going connection from the internal space 17 of the guide cylinder 16, through the throughhole 65 of the piston rod through the throughbore hole 67 of the piston rod tube 66, through a central bore 76 and a transition borehole 78, which are associated with the distributor block 56, to the support strut 93 or as the case may be there in integrated supply channel 93a, and therewith to the externally lying connection element 98 or as the case may be the thereon attached supply line 98a. A precondition therefor is that the pressure plate 50 with the thereon associated seal 52 is securely pressed against the pressure plate 22 and the connection area of the axial bore 30 is tightly encompassed. A construction of this type is shown in FIG. 4.

Figure 5:
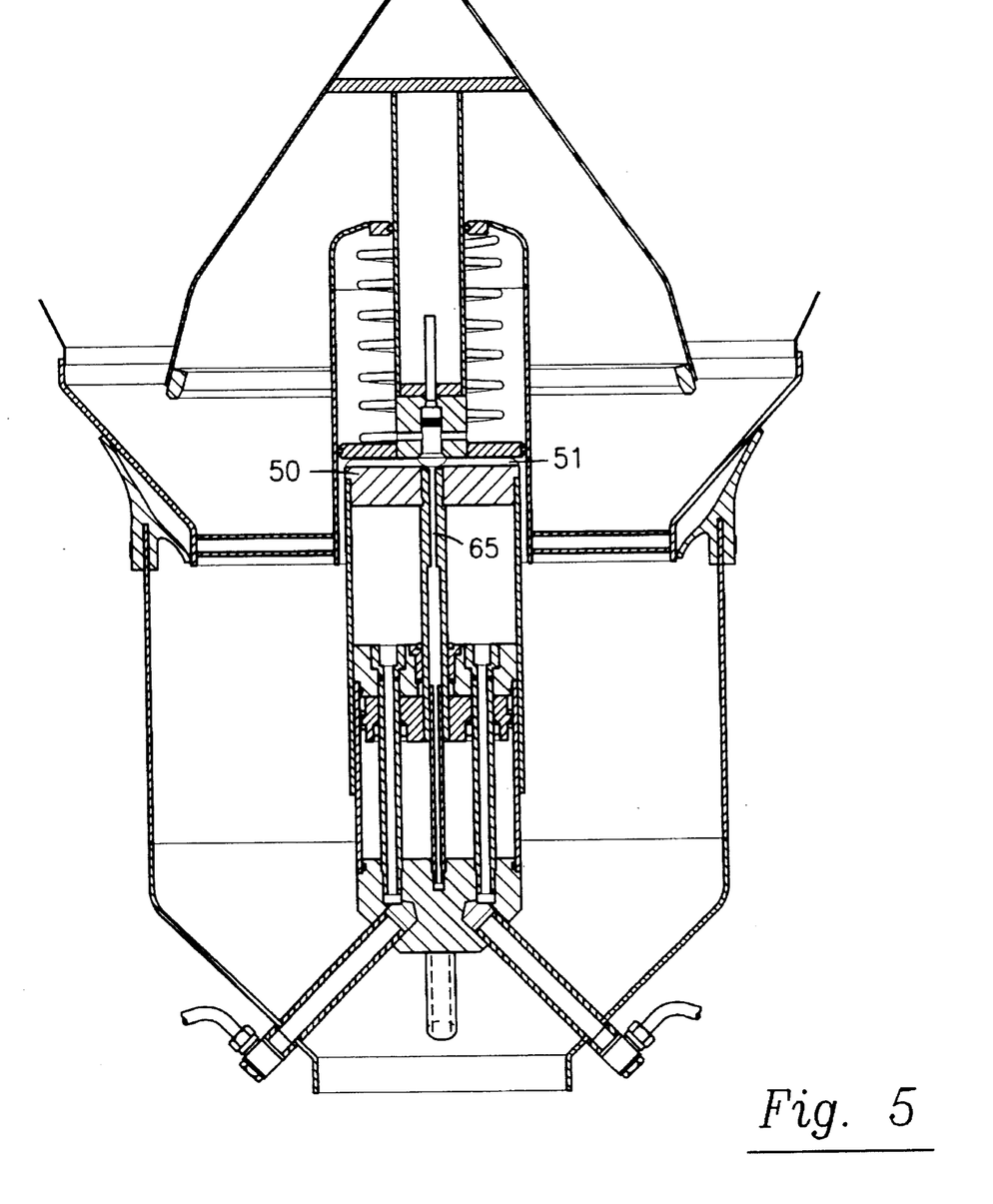

In FIG. 5, there is shown a slightly modified configuration. In this case, the pressure plate 50 is provided with through-going, radially extending recess 51, which connects with the transmission bore 65 of the piston rod 64. Further, the pressure plate 50 is provided with no sealing means in the mouthing or orifice connecting area the of the through-bore hole 65. Therewith a deflation canal is established by the recess 51, when the pressure plate 50 is brought into association with the pressure disk This channel connects in the ring cleft between the internal wall of the guide cylinder 16 and the casing 54, so that an outwardly directed air flow path ridge-way is produced, which prevent a penetration of dirt particles in this area, in particular, in the radial cleft between the guide cylinder 16 and the casing 54, or as the case may be, removes any particles from the preceding displacement place. Through targeted supply and removal of air via the supply line 98 the desired air flow can be initiated independent of the respective movement directions of the pressure plate 50.

The remaining design features, as can be seen from FIGS. 3–5, concern the supply and removal of air to the internal space 84 between the cylinder lid 58 and the pressure plate 50 as well as the displacement space 86.

For filling and removal of air in the interstitial space 84 there is provided a tube 80 which is sealed in the cylinder space 82 inclusive of the therein guided piston 62 and between the distributor block 56 and the cylinder lid 58. The tube 80 is provided with a through-opening 81 which connects on the one hand in the interstitial space 84 and on the one hand in the transition borehole 78 of the distributor block 56, so that via the transition bore 78 and the supply channel 82a integrated in the support strut 92 a continuous connection is established to the connection element 97 or as the case may be to the supply line 97a. The targeted supply and removal of air from the interstitial space 84 is not to say the least therefor from great importance, that thereby it can be insured that no small particles penetrate into the relatively narrow cleft between the casing 54 and the cylinder wall 60. This danger occurs especially during the upward movement of the pressure plate 54 since thereby the volume of the interstitial space 84 is increased and the tendency for the creation of low pressure occurs, which is met by the targeted supply of pressed air via the supply line 97a.

For the pressure inflating and deflation of the displacement space 86 a further tube 88 is provided, which extends between the distributor block 56 and the cylinder lid 58 and completely transits through the cylinder space 82 inclusive of the therein guided piston 62. The tube 88 is provided with a radially extending bore 89, which immediately adjacent to the cylinder lid has an orifice connection into the displacement space 86. Further, there is a distributor block 56 a transition bore hole 90 provided, so that via the strut 94 or as the case may be the therein integrated supply channel 94a connection is established to the corresponding connection element 99 with the supply line 99a.

The tubes 80,88 are constructed as special screws so that they can simultaneously serve to support and connect the distributor block 56 with the cylinder lid 58 via the cylinder wall 60.

What can be seen from the above is that the four struts 91,92,93,94, which primarily serve for supporting of the pneumatic lift device 7, additionally serve for the controlled supply and removal of air. This concerns on the one hand the supply of the air necessary for the actuation of the closing part 3 and, on the other hand, the supply of air which is needed for the targeted filling and deflation of the diverse spaces, for example, the internal space 17 or the interstitial space 84 as necessary. For this purpose, there are provided the respective supply lines 96a, 97a, 98a, 99a which are operated individually and separately via a control and regulating means for the establishment and to maintenance of desired pressure relationships. The control means must thus be capable of continuously monitoring and addressing rapidly changing dynamic conditions which occur during the actuation process.

Figure 6:
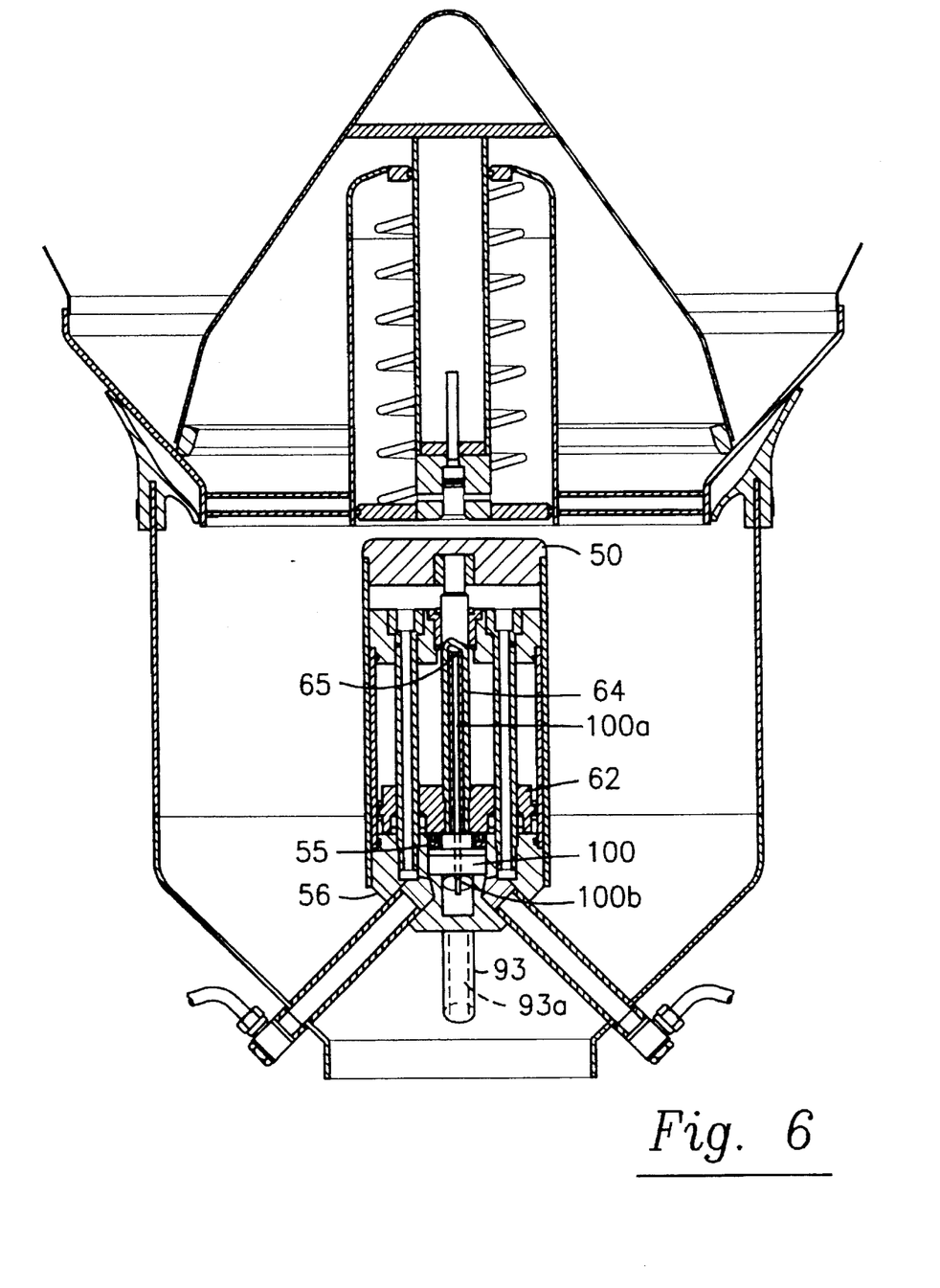

In FIG. 6, there is shown a further variation of the invention in which a contactless displacement pickup is integrated into the pneumatic lift device 7. More specifically, this concerns a so-called long displacement pickup, with the help of which the position of the piston 62 is determined. The resulting signal is then transmitted to a computer, which ensures therefor, that the piston 62—and therewith the pressure plate 50—accomplishes an exactly prescribed lifting.

The displacement pickup 100 is seated in the distributor block 56 and is fastened with a fastening ring 55. The displacement pickup 100 is provided with a sensing probe tube 100a which projects into the inside of the piston rod 64. The sensing probe tube 100a has no contact with the piston rod 64, that is, determines the motion thereof or as the case may be position thereof without contacting.

On the back side of the displacement pickup 100 there is provided a connecting cable 100b. It is installed within support strut 93, so that it is protected from damage by the by-flowing bulk material.

It is obvious, that in the exemplary embodiment according to FIG. 6 a supply and removal of air to the internal space 17 of the guide cylinder 16 through the piston rod 64 is not possible, since the therefore necessary space is taken up by the displacement pickup 100. Accordingly, the pressurization and deflation as discussed above must either be forgone, or else must be accomplished by different means. The discharge device according to the present invention can operate even under the highest demands and is suitable in particular for employment in critical situations such as, for example, in foodstuffs and the pharmaceutical industry.

INDEX OF REFERENCE NUMBERS 1 bulk material container
2 discharge funnel
3 closure part
4 guide
5 lid
6 sealing cuff
7 lift device
8 flow-through area
9 emptying station
10 sealing ring (gasket ring, packing ring)
11 void
12 cylindrical guideway
14 closure (close off)
16 guide cylinder
17 internal void
18 sealing ring
20 disk
21 face side
22 pressure disk
23 carrier ring (bearing ring)
24 pressure rod
26 axial segment
28 radial bore
30 axial bore
32 ring seal
38 strut
40 return spring
41 lengthening pipe, upper portion of casing
42 flow through area
50 pressure plate
51 groove
52 seal
54 casing
55 fastening ring, holding ring, guard ring
56 distribution ring
58 cylinder lid (closure)
59 seal ring
60 cylinder wall
61 seal
62 piston
64 piston rod
65 through hole
66 piston rod tube
67 through hole
68 guide box
72 supply conduit, channel
74 connecting bore hole
76 central bore hole
78 transition or connecting bore hole
79 transition or connecting bore hole
80 tube, pipe
81 through hole
82 cylinder space
84 intermediate space
86 displacement space, upper
87 displacement space, lower
88 tube, pipe
89 bore hole
90 through hole
91 support strut, strengthening strut
91a supply channel, canal
92 support strut
92a supply channel
93 support strut, strengthening strut
93a supply channel, canal
94 support strut
94a supply channel
96 connecting element, part
96a supply channel
97 connecting element, part
97a supply channel
98 connecting element, part
98a supply channel
99 connecting element, part
99a supply channel
100 displacement pickup
100a probe tube
100b connecting cable (by-pass or distributing cable)

What is claimed is:

1. Emptying device for a bulk material container, said device comprising:

a discharge funnel having an outer wall and an inner wall;

a cylindrical guide (4) comprising a guide cylinder (16) supported in the discharge funnel by means of struts, said guide cylinder defining an internal space (17), an axially displaceable pressure disk (22) provided within the lower end of said cylindrical guide (4), a pressure rod (24) mounted on said pressure disk, said pressure rod (24) transiting axially upwardly through the guide cylinder (16);

an upside-down cone-shaped closure part having a lower circumferrence adapted for sealing engagement with said discharge funnel and mounted on said pressure rod (24) of said guide cylinder so as to be axially displaceable between a raised open position and a lowered closed position;

return spring means (40) for urging said closure part against the internal walls of said discharge funnel when said closure part is in the closed position, said return spring means extending axially within the internal space (17) of the guide cylinder (16), such that raising said pressure disk compresses said return spring means; and pneumatic lifting means for lifting said closure part from said lowered closed position to said raised open position.

2. Emptying device according to claim 1, wherein the internal space (17) of the guide cylinder (16) is sealed off from the ambient environment and which can be pressurized and depressurized via channels (28), (30) in said pressure rod.

3. Emptying device according to claim 2, wherein the disk (22) on its outer circumference is provided with a circumscribing ring seal (32), which is adapted to sealingly conform to the inner wall of the guide cylinder (16) when said closing part is in the closed position, and wherein the guide cylinder (16) is provided with a ring seal (18), which contacts the pressure rod (24).

4. Emptying device according to claim 2, wherein the pressure rod (24) is provided, on the end facing the pressure disk (22), with an axial section (26), which is provided with a central axial bore (30), which proceeds from the lower side (21) and connects with at least one essentially radially extending bore (28), which radially extending bore has connection with the internal space (17) of the guide cylinder (16).

5. Emptying device according to claim 1, wherein the cross section of the outer contour of the strut (93) provides a contour which is essentially not horizontal.

6. Emptying device for a bulk material container, said device comprising:

a discharge funnel having an outer wall and an inner wall;

a cylindrical guide (4) comprising a guide cylinder (16) supported in the discharge funnel by means of struts, said guide cylinder defining an internal space (17), an axially displaceable pressure disk (22) provided within the lower end of said cylindrical guide (4), a pressure rod (24) mounted on said pressure disk, said pressure rod (24) transiting axially upwardly through the guide cylinder (16;

an upside-down cone-shaped closure part having a lower circumferrence adapted for sealing engagement with said discharge funnel and mounted on said pressure rod (24) of said guide cylinder so as to be axially displaceable between a raised open position and a lowered closed position;

return spring means (40) for urging said closure part against the internal walls of said discharge funnel when said closure part is in the closed position, said return spring means extending axially within the internal space (17) of the guide cylinder (16), such that raising said pressure disk compresses said return spring means;

an emptying station (9) having a flow-through area (42) defined therein;

a pneumatic lifting device (7) for lifting said closure part from said lowered closed position to said raised open position, wherein said pneumatic lifting device (7) is comprised of a single, centrally located pneumatic cylinder (50–90) which is held in place by radially extending support struts (91, 92, 93, 94) in the flow-through area (42) of the emptying station (9) and that supply channels (91a, 92a, 93a, 94a) are integrated inside the support struts.

7. Emptying device according to claim 6, wherein the support struts (91, 92, 93, 94) are tubes.

8. Emptying device according to claim 6, wherein the emptying station (9) includes inner walls and outer walls, and wherein said outer wall of said emptying station (9) is provided with connection elements (96, 97, 98, 99) for supply lines (96a, 97a, 98a, 99a), which establish connections to the supply channels (91a, 92a, 93a, 94a) of the support struts.

9. Emptying device according to claim 6, wherein the support struts (91, 92, 93, 94) are connected to a central distributor block (56) as a construction component of the pneumatic cylinder (50–90).

10. Emptying device according to claim 9, wherein the distributor block (56) is seated tightly against a cylinder wall (60), the cylinder wall provided on one end with a cylinder lid (58), so that within the cylinder a space (82) is established, in which a piston (62) is axially slidably provided, and wherein for pressurization and deflation an integrated supply channel (72) is provided in the distributor block (56), which supply channel (72) is connected to a connecting element (96) via a transition bore (72) and a therein disposed strut (91) so that a continuous communication is established between the connection element (96) and that part of the cylinder space (82) which is formed between the piston (62) and distributor block (56) (lower displacement space 87).

11. Emptying device according to claim 10, wherein the piston (62) is provided with a piston rod (64), which transits axially through the cylinder space (82) and penetrates via a sealed connection through the cylinder lid (58) and which is provided on its upper end with a pressure plate (50) which is directed against pressure disk (22) of the closing part (3).

12. Emptying device according to claim 11, wherein the pressure plate (50) is provided with a downward facing casing (54) which circumscribes and is guided by the cylinder wall (60) with minimal radial tolerance.

13. Emptying device according to claim 11, wherein a central piston rod tube (66) is provided on the distributor block (56) for inflation and deflation of the internal space (17) of the guide cylinder (16), upon which piston rod tube (66) the piston rod (64) is guided axially displaceable and sealed, and wherein the piston rod (64) is provided with a bore hole (65) which on the one hand provides connection to a bore hole (67) of the piston rod tube (66) and on the other hand connects to the upper side of the pressure plate (50) in the area of a ring seal (52), so that with respect to the environment a sealed, continuous connection is formed from the internal space (17) of the guide cylinder (16) to the corresponding connecting element (98) of the emptying station (9), when the pressure plate (50) is brought into operational engagement against the pressure disk (22).

14. Emptying device according to claim 11, wherein the distributor block (56) is provided with a central piston rod tube (66) for filling and emptying of internal space (17) of the guide cylinder (16), upon which central piston rod tube (66) a piston rod (64) is guided axially displaceably and sealed, and wherein the piston rod (64) is provided with a bore hole (56), which at one end is in communication with a bore hole (67) of the piston rod tube (66) and on the other end is in communication with the face of the pressure plate (50) in the area of a through-going, radially extending recess (51), so that a continuous connection is formed from the internal space (17) of the guide cylinder (16) to the corresponding connecting element (98) of the emptying station (9) and wherein a supplemental depressurization channel is formed via the recess (51), when the pressure plate (50) is brought into operational engagement with the pressure disk (22).

15. Emptying device according to claim 11, wherein a tube (80) is provided for emptying and filling of the interstitial space (84) between the cylinder lid (58) and the pressure plate (50), which is sealed and which completely transits the cylinder space (82) between the distributor block (56) and the cylinder lid (58) inclusive of the therein provided piston (62), and which connects the interstitial space (84) with the transition bore (79) in the distributor block (56), so that a continuous connection is established between the interstitial space (84) and the corresponding connecting element (98).

16. Emptying device according to claim 11, wherein for the pressurization and deflation of the respective segment of the cylinder space (82) which lies between the piston (62) and the cylinder lid (58) (upper displacement space (86)), a tube (88) is provided which is sealed and which completely transitions the cylinder space (82) between the distributor block (56) and the cylinder lid (58) inclusive of the therein provided piston (62), and which connects, via bore (89) immediately adjacent the cylinder lid (58), the displacement space (86) with the transition bore (90) in the distributor block (56), so that a continuous connection between the upper displacement space (86) and the corresponding connecting element (99) is formed.

17. Emptying device according to claim 15, wherein tube (80, 88) is provided with threaded ends adapted to screwint into said cylinder lid (58) and said distributor block (56) for holding the cylinder lid (58) in spaced relation to the distributor block (56).

18. Emptying device according to claim 10, wherein a displacement pickup (100) is provided for the determination of the position of the piston (62).

19. Emptying device according to claim 18, wherein the displacement pickup (100) is provided coaxially with the distributor block (56) and wherein it penetrates into the bore (65) of the piston rod (64) via a probe tube (100*a*).

20. Emptying device according to claim 18, wherein the attachment cable (100*b*) is installed so as to run within the support strut (93).

* * * * *